(12) United States Patent
Rath et al.

(10) Patent No.: US 8,126,859 B2
(45) Date of Patent: Feb. 28, 2012

(54) UPDATING A LOCAL VERSION OF A FILE BASED ON A RULE

(75) Inventors: Cale T. Rath, Byron, MN (US); Megan Erin Williams, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1329 days.

(21) Appl. No.: 11/388,012

(22) Filed: Mar. 23, 2006

(65) Prior Publication Data

US 2007/0226273 A1 Sep. 27, 2007

(51) Int. Cl.
*G06F 7/00* (2006.01)
*G06F 17/00* (2006.01)
*G06F 15/16* (2006.01)

(52) U.S. Cl. .................. 707/695; 707/638; 709/217

(58) Field of Classification Search .................. 707/638, 707/695; 709/217; 717/170
See application file for complete search history.

(56) References Cited

U.S. PATENT DOCUMENTS 6,073,168 A * 6/2000 Mighdoll et al. ............. 709/217

* cited by examiner

*Primary Examiner* — Apu Mofiz
*Assistant Examiner* — Chelcie Daye
(74) *Attorney, Agent, or Firm* — Owen J. Gamon

(57) ABSTRACT

In an embodiment, a local version of a file is found in response to detecting an access of a remote version of the file. In response to the detecting, a determination is made whether the remote version meets a rule, and if the rule is met, then the local version is updated with the remote version of the file if the remote version is valid. The rule may be customized for the file. In various embodiments, the determination includes determining whether the remote version of the file was created more recently than the local version, whether the remote version has a level that is greater than the level of the local version, or whether the remote version is stored at a source location specified by the rule. In various embodiments, the level may be an audio or video quality of the file or an update identifier of the file. In this way, out-of date local versions of files may be updated with newer or better remote versions of files.

19 Claims, 4 Drawing Sheets

FILE ATTRIBUTE DATA — 154

| FILE ID | RETRIEVAL SOURCE LOCATION ID | LEVEL | DATE | |
|---|---|---|---|---|
| FILE A | WWW.HOSTNAMEA.COM/DIRECTORY/FILENAMEA.MP3 | 96 KB/SEC | 10/2/2005 | 205 |
| FILE B | WWW.HOSTNAMEB.COM/DIRECTORY/FILENAMEB.MP3 | 256 KB/SEC | 9/1/1998 | 210 |
| FILE C | WWW.HOSTNAMEC.COM/DIRECTORY/FILENAMEC.MP3 | 1024 KB/SEC | 6/15/2001 | 215 |
| FILE D | WWW.HOSTNAMED/DIRECTORY/DRIVERS | 1.2.3 | 1/25/2006 | 220 |
| FILE E | SEARCH FOR THE FILE ID AT ANY SOURCE LOCATION | 2.1 | 11/1/2005 | 225 |

FIG. 2

RULES — 156

| FILE ID | RULE | |
|---|---|---|
| FILE A | ONLY UPDATE IF LEVEL > 512 KB/SEC | 305 |
| FILE B | ONLY UPDATE IF LEVEL OF REMOTE FILE VERSION > LEVEL OF LOCAL FILE VERSION | 310 |
| FILE D | ONLY UPDATE FROM WWW.HOSTNAMED.COM/DIRECTORY/DRIVERS AND IF LEVEL OF REMOTE FILE VERSION > LEVEL OF LOCAL FILE VERSION | 315 |
| ALL FILES | ONLY UPDATE IF DATE OF REMOTE FILE VERSION > DATE OF LOCAL FILE VERSION | 320 |
| ALL FILES | ONLY UPDATE IF LOCAL FILE VERSION HAS NOT BEEN EDITED LOCALLY | 322 |

FIG. 3

UPDATING A LOCAL VERSION OF A FILE BASED ON A RULE

FIELD

An embodiment of the invention generally relates to computers. In particular, an embodiment of the invention generally relates to updating a local version of a file from a remote version based on a rule.

BACKGROUND

The development of the EDVAC computer system of 1948 is often cited as the beginning of the computer era. Since that time, computer systems have evolved into extremely sophisticated devices, and computer systems may be found in many different settings. Computer systems typically include a combination of hardware, such as semiconductors and circuit boards, and software, also known as computer programs.

Years ago, computers were stand-alone devices that did not communicate with each other, but today, computers are increasingly connected in networks and one computer, called a client, may request another computer, called a server, to perform an operation. One operation in common use is downloading files from a server to a client. Examples of these files include video, audio, documentation, drivers, applications, and operating systems. As these files are changed or upgraded, multiple versions of the files become available.

For example, drivers are needed to control the attachment of hardware devices (such as printers, microphones, display devices, etc.) to a computer. New drivers may become available in order to provide new function, support new devices, or to fix problems that existed in previous drivers. Clients tend to have many drivers, these drivers tend to be updated with new versions frequently, and the drivers tend to have originated from many source locations, such as the websites of many different device manufacturers. As another example, a client may have a large collection of music files which have a variety of audio qualities, such as 96 kb/second, but later a better audio quality, such as 256 kb/second, may become available. The client may have obtained these audio files from a wide variety of servers, such as online stores that sell downloadable copies of music.

Because of the large number of files that clients tend to have, the large number of versions of the files, and the disparate locations of the versions on servers, users tend to experience difficulty in keeping the versions of the files up-to-date. Finding the local versions at the client, finding the corresponding remote versions at the servers, determining whether the remote versions are newer or better than the local versions at the client, and downloading the remote versions can be a difficult and time-consuming task.

Hence a better way is needed for clients to find and manage versions of files.

SUMMARY

A method, apparatus, system, and signal-bearing medium are provided. In an embodiment, a local version of a file is found in response to detecting an access of a remote version of the file. In response to the detecting, a determination is made whether the remote version meets a rule, and if the rule is met, then the local version is updated with the remote version of the file if the remote version is valid. The rule may be customized for the file. In various embodiments, the determination includes determining whether the remote version of the file was created more recently than the local version, whether the remote version has a level that is greater than the level of the local version, or whether the remote version is stored at a source location specified by the rule. In various embodiments, the level may be an audio or video quality of the file or an update identifier of the file. In this way, out-of-date local versions of files may be updated with newer or better remote versions of files.

BRIEF DESCRIPTION OF THE DRAWING

FIG. 2 depicts a block diagram of an example data structure for file attribute data, according to an embodiment of the invention.

FIG. 3 depicts a block diagram of an example data structure for rules, according to an embodiment of the invention.

DETAILED DESCRIPTION

In an embodiment, a utility determines whether to update local versions of files with remote versions based on rules. In various embodiments, the utility makes the determination in response to an access of the remote version or by periodically finding the remote versions that correspond to its local versions. The utility may also validate the remote versions before updating the local versions. The rules may be customized for the individual files. In various embodiments, the determination may include determining whether the remote version was created more recently than the local version, whether the remote version has a level that is greater than (e.g., higher, better, more advanced, with more function, or more recent) the level of the local version, or whether the remote version is stored at a source location specified by the rule. In various embodiments, the level may be an audio or video quality of the file or an update identifier of the file. In this way, out-of-date, down-level, or less advanced local versions of files may be updated with newer or better remote versions of files.

Figure 1:
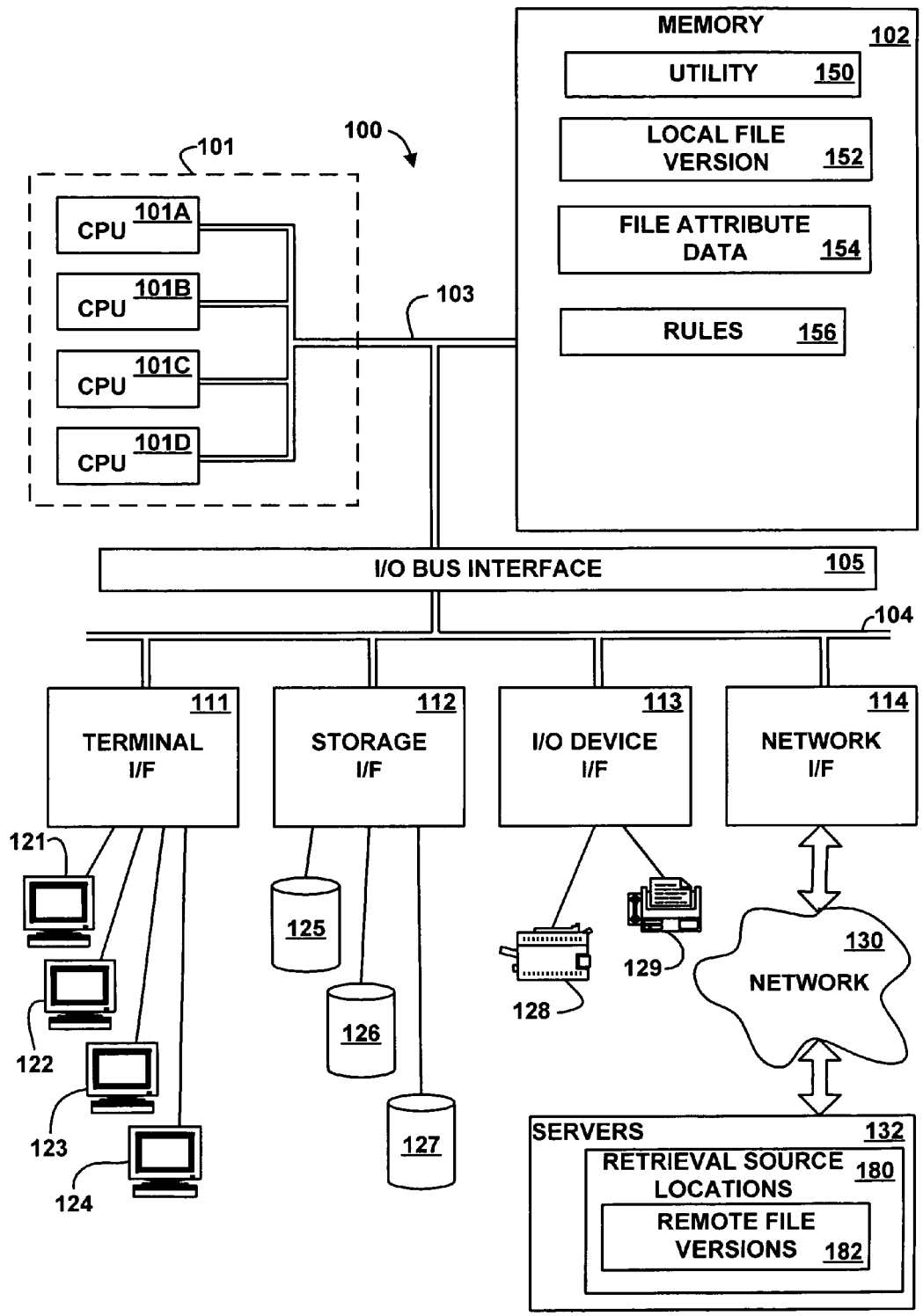
FIG. 1 depicts a block diagram of an example system for implementing an embodiment of the invention.

Referring to the Drawings, wherein like numbers denote like parts throughout the several views, FIG. 1 depicts a high-level block diagram representation of a computer system 100 connected to servers 132 via a network 130, according to an embodiment of the present invention. The major components of the computer system 100 include one or more processors 101, a main memory 102, a terminal interface 111, a storage interface 112, an I/O (Input/Output) device interface 113, and communications/network interfaces 114, all of which are coupled for inter-component communication via a memory bus 103, an I/O bus 104, and an I/O bus interface unit 105.

The computer system 100 contains one or more general-purpose programmable central processing units (CPUs) 101A, 101B, 101C, and 101D, herein generically referred to as the processor 101. In an embodiment, the computer system 100 contains multiple processors typical of a relatively large system; however, in another embodiment the computer system 100 may alternatively be a single CPU system. Each processor 101 executes instructions stored in the main memory 102 and may include one or more levels of on-board cache.

The main memory 102 is a random-access semiconductor memory for storing data and programs. The main memory 102 is conceptually a single monolithic entity, but in other embodiments, the main memory 102 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may further be distributed and associated with different CPUs or sets of CPUs, as is known in any of various so-called non-uniform memory access (NUMA) computer architectures.

The memory 102 includes a utility 150, a local file version 152, file attribute data 154, and rules 156. Although the utility 150, the local file version 152, the file attribute data 154, and the rules 156 are illustrated as being contained within the memory 102 in the computer system 100, in other embodiments some or all of them may be on different computer systems and may be accessed remotely, e.g., via the network 130. The computer system 100 may use virtual addressing mechanisms that allow the programs of the computer system 100 to behave as if they only have access to a large, single storage entity instead of access to multiple, smaller storage entities. Thus, while the utility 150, the local file version 152, the file attribute data 154, and the rules 156 are all illustrated as being contained within the memory 102 in the computer system 100, these elements are not necessarily all completely contained in the same storage device at the same time. Further, although the utility 150, the local file version 152, the file attribute data 154, and the rules 156 are illustrated as being separate entities, in other embodiments some of them, portions of some of them, or all of them may be packaged together.

The local file version 152 may include any appropriate type of data and/or code, such as a music file, an audio file, a video file, a graphics image file, a text file, a driver, an application, an operating system, executable code, interpretable statements, any portion, multiple, or combination thereof, or any other appropriate type of file. The file attribute data 154 describes the local file versions 152. The file attribute data 154 is further described below with reference to FIG. 2. The rules 156 describe conditional criteria for updating the local file version 152. The rules 156 are further described below with reference to FIG. 3.

The utility 150 updates the local file version 152 based on the file attribute data 154 and the rules 156. In an embodiment, the utility 150 includes instructions capable of executing on the processor 101 or statements capable of being interpreted by instructions executing on the processor 101 to perform the functions as further described below with reference to FIGS. 4 and 5. In another embodiment, the utility 150 may be implemented in microcode. In another embodiment, the utility 150 may be implemented in hardware via logic gates and/or other appropriate hardware techniques in lieu of or in addition to a processor-based system.

The memory bus 103 provides a data communication path for transferring data among the processors 101, the main memory 102, and the I/O bus interface unit 105. The I/O bus interface unit 105 is further coupled to the system I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the system I/O bus 104. The system I/O bus 104 may be, e.g., an industry standard PCI (Peripheral Component Interconnect) bus, or any other appropriate bus technology. The I/O interface units support communication with a variety of storage and I/O devices. For example, the terminal interface unit 111 supports the attachment of one or more user terminals 121, 122, 123, and 124.

The storage interface unit 112 supports the attachment of one or more direct access storage devices (DASD) 125, 126, and 127, which are typically rotating magnetic disk drive storage devices, although they could alternatively be other devices, including arrays of disk drives configured to appear as a single large storage device to a host. The contents of the DASD 125, 126, and 127 may be loaded from and stored to the memory 102 as needed. The storage interface unit 112 may also support other types of devices, such as a diskette device, a tape device, an optical device, or any other type of storage device.

The I/O device interface 113 provides an interface to any of various other input/output devices or devices of other types. Two such devices, the printer 128 and the fax machine 129, are shown in the exemplary embodiment of FIG. 1, but in other embodiment many other such devices may exist, which may be of differing types.

The network interface 114 provides one or more communications paths from the computer system 100 to other digital devices and computer systems; such paths may include, e.g., one or more networks 130. In various embodiments, the network interface 114 may be implemented via a modem, a LAN (Local Area Network) card, a virtual LAN card, or any other appropriate network interface or combination of network interfaces.

Although the memory bus 103 is shown in FIG. 1 as a relatively simple, single bus structure providing a direct communication path among the processors 101, the main memory 102, and the I/O bus interface 105, in fact the memory bus 103 may comprise multiple different buses or communication paths, which may be arranged in any of various forms, such as point-to-point links in hierarchical, star or web configurations, multiple hierarchical buses, parallel and redundant paths, etc. Furthermore, while the I/O bus interface 105 and the I/O bus 104 are shown as single respective units, the computer system 100 may in fact contain multiple I/O bus interface units 105 and/or multiple I/O buses 104. While multiple I/O interface units are shown, which separate the system I/O bus 104 from various communications paths running to the various I/O devices, in other embodiments some or all of the I/O devices are connected directly to one or more system I/O buses.

The computer system 100 depicted in FIG. 1 has multiple attached terminals 121, 122, 123, and 124, such as might be typical of a multi-user "mainframe" computer system. Typically, in such a case the actual number of attached devices is greater than those shown in FIG. 1, although the present invention is not limited to systems of any particular size. The computer system 100 may alternatively be a single-user system, typically containing only a single user display and keyboard input, or might be a server or similar device which has little or no direct user interface, but receives requests from other computer systems (clients). In other embodiments, the computer system 100 may be implemented as a firewall, router, Internet Service Provider (ISP), personal computer, portable computer, laptop or notebook computer, PDA (Personal Digital Assistant), tablet computer, pocket computer, telephone, pager, automobile, teleconferencing system, appliance, or any other appropriate type of electronic device.

The network 130 may be any suitable network or combination of networks and may support any appropriate protocol suitable for communication of data and/or code to/from the computer system 100. In various embodiments, the network 130 may represent a storage device or a combination of storage devices, either connected directly or indirectly to the computer system 100. In an embodiment, the network 130 may support Infiniband. In another embodiment, the network 130 may support wireless communications. In another embodiment, the network 130 may support hard-wired communications, such as a telephone line or cable. In another embodiment, the network 130 may support the Ethernet IEEE (Institute of Electrical and Electronics Engineers) 802.3x specification. In another embodiment, the network 130 may be the Internet and may support IP (Internet Protocol). In another embodiment, the network 130 may be a local area network (LAN) or a wide area network (WAN). In another embodiment, the network 130 may be a hotspot service provider network. In another embodiment, the network 130 may be an intranet. In another embodiment, the network 130 may be a GPRS (General Packet Radio Service) network. In another embodiment, the network 130 may be a FRS (Family Radio Service) network. In another embodiment, the network 130 may be any appropriate cellular data network or cell-based radio network technology. In another embodiment, the network 130 may be an IEEE 802.11B wireless network. In still another embodiment, the network 130 may be any suitable network or combination of networks. Although one network 130 is shown, in other embodiments any number of networks (of the same or different types) may be present.

The servers 132 may include any or all of the hardware and-or software components of the computer system 100, as previously described above. The servers 132 further include retrieval sources 180, which are storage locations that store remote file versions 182 of the local file version 152. The remote file version 182 may be the same version as the local file version 152, may be a different version from the local file version 152, may include the same content, slightly different content, or completely different content from the local file version 152, and may be newer or older than the local file version 152.

It should be understood that FIG. 1 is intended to depict the representative major components of the computer system 100, the network 130, and the servers 132 at a high level, that individual components may have greater complexity than represented in FIG. 1, that components other than, fewer than, or in addition to those shown in FIG. 1 may be present, and that the number, type, and configuration of such components may vary. Several particular examples of such additional complexity or additional variations are disclosed herein; it being understood that these are by way of example only and are not necessarily the only such variations.

The various software components illustrated in FIG. 1 and implementing various embodiments of the invention may be implemented in a number of manners, including using various computer software applications, routines, components, programs, objects, modules, data structures, etc., referred to hereinafter as "computer programs," or simply "programs." The computer programs typically comprise one or more instructions that are resident at various times in various memory and storage devices in the computer system 100, and that, when read and executed by one or more processors in the computer system 100, cause the computer system 100 to perform the steps necessary to execute steps or elements embodying the various aspects of an embodiment of the invention.

Moreover, while embodiments of the invention have and hereinafter will be described in the context of fully functioning computer systems, the various embodiments of the invention are capable of being distributed as a program product in a variety of forms, and the invention applies equally regardless of the particular type of signal-bearing medium used to actually carry out the distribution. The programs defining the functions of this embodiment may be delivered to the computer system 100 via a variety of tangible signal-bearing media that may be operatively or communicatively connected (directly or indirectly) to the processor 101. The signal-bearing media may include, but are not limited to:

(1) information permanently stored on a non-rewriteable storage medium, e.g., a read-only memory device attached to or within a computer system, such as a CD-ROM readable by a CD-ROM drive;

(2) alterable information stored on a rewriteable storage medium, e.g., a hard disk drive (e.g., DASD 125, 126, or 127), CD-RW, or diskette; or (3) information conveyed to the computer system 100 by a communications medium, such as through a computer or a telephone network, e.g., the network 130.

Such tangible signal-bearing media, when encoded with or carrying computer-readable and executable instructions that direct the functions of the present invention, represent embodiments of the present invention.

Embodiments of the present invention may also be delivered as part of a service engagement with a client corporation, nonprofit organization, government entity, internal organizational structure, or the like. Aspects of these embodiments may include configuring a computer system to perform, and deploying software systems and web services that implement, some or all of the methods described herein. Aspects of these embodiments may also include analyzing the client company, creating recommendations responsive to the analysis, generating software to implement portions of the recommendations, integrating the software into existing processes and infrastructure, metering use of the methods and systems described herein, allocating expenses to users, and billing users for their use of these methods and systems.

In addition, various programs described hereinafter may be identified based upon the application for which they are implemented in a specific embodiment of the invention. But, any particular program nomenclature that follows is used merely for convenience, and thus embodiments of the invention should not be limited to use solely in any specific application identified and/or implied by such nomenclature.

The exemplary environments illustrated in FIG. 1 are not intended to limit the present invention. Indeed, other alternative hardware and/or software environments may be used without departing from the scope of the invention.

FIG. 2 depicts a block diagram of an example data structure for the file attribute data 154, according to an embodiment of the invention. The example file attribute data 154 includes records 205, 210, 215, 220, and 225, each of which includes an example file identifier field 240, a retrieval source location identifier field 245, a level field 250, and a date field 260. Each of the records 205, 210, 215, 220, and 225 identifies a respective local file version 152.

The file identifier 240 identifies a file or files of which the local file version 152 and the remote file version 182 are versions. A "file," as used herein, may refer to data, code, a flat file, a database, a table, a row, a column, a record, a library, a directory, a subdirectory, a list, a graph, video, audio, an image, text, documentation, a driver, executable code, interpretable statements, a control tag, an application, a user application, a third-party application, an operating system, any other identifiable unit of information, or any multiple, combination, or portion thereof. The local file version 152 and the remote file version 182 of the file are associated (by their common file identifier 240) and may have some contents in common and some changed content, or they may have completely different content.

The retrieval source location identifier 245 identifies the retrieval source location 180 from which the local file version 152 identified by the file identifier 240 was retrieved. In various embodiments, the retrieval source location identifier 245 may be expressed in terms of a URL (Universal Resource Identifier), a network address, a file name and path, a path, a directory, search terms, or any other appropriate identifier.

In an embodiment, the level 250 identifies a quality level of the local file version 152, such as an audio quality, a video quality, a compression level, or a density of information in the local file version 152. In another embodiment, the level 250 indicates an update identifier of the local file version 152, such as an indication of the release level and/or the version level of the local file version 152. In various embodiments, the date 260 indicates the creation and/or modification date and/or time of the local file version 152 identified by the file identifier 240. Thus, while the local file version 152 and the corresponding remote file version 182 have the same file identifier, which identify them as representing the same file, they may have different levels and/or dates, which identify them as different versions of that file, meaning that some or all of the content may be changed between the local file version 152 and the corresponding remote file version 182.

The file attribute data 154 may be stored in a different system or different storage device from the local file version 152, so that if the storage device or system that stores the local file version 152 becomes corrupted or damaged or the local file version 152 is inadvertently deleted, the file attribute data 154 may be used to restore the local file version 152.

FIG. 3 depicts a block diagram of an example data structure for the rules 156, according to an embodiment of the invention. The rules 156 include example records 305, 310, 315, 320, and 322, each of which includes a file identifier field 325, and a rule field 330. The file identifier field 325 identifies a file or files of which the local file version 152 and the remote file version 182 are versions. The rule field 330 identifies a conditional criteria that the utility 150 uses to decide whether to update the local version 152 with the remote file version 182. In various embodiments, the rule 330 may specify a criteria for determining whether the remote version 182 was created more recently than the local version 152 (based on the date 260) or was created after or before a date specified in the rule 330, for determining whether the remote version 182 has a level that is greater than (e.g., higher, better, more advanced, with more function, or more recent) the level 250 of the local version or based on a level specified in the rule 330, for determining whether the remote version 182 is stored at a source location 180 that matches a source location specified in the rule 330 or in the retrieval source location 245, for determining whether the local version 152 has not been edited or modified locally (e.g. by a user via an editor at the computer 100) subsequent to the most-recent update from the remote version 182, or any portion, multiple, or combination thereof.

Figure 4:
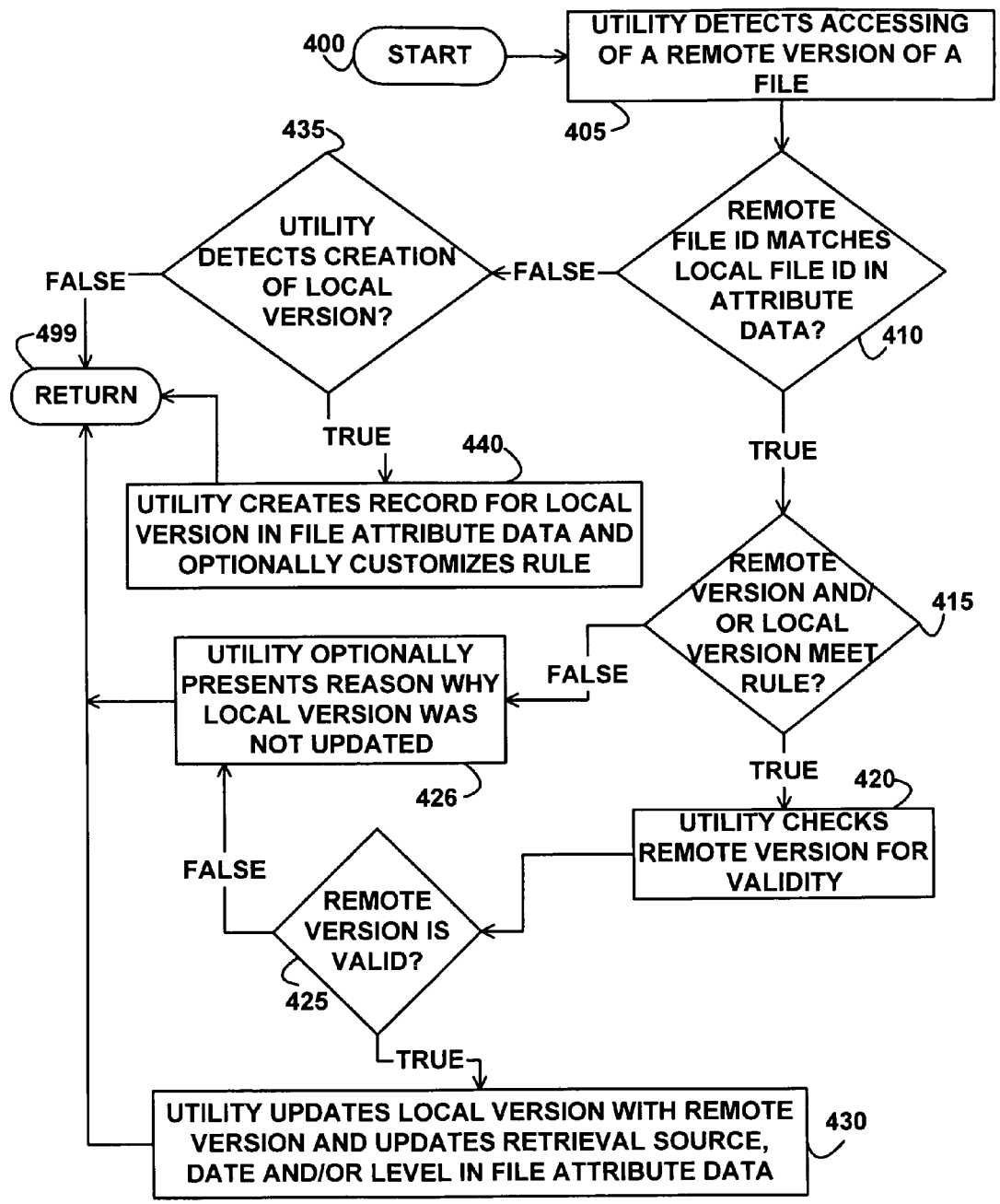
FIG. 4 depicts a flowchart of processing for updating a local file version in response to an access of a remote file version, according to an embodiment of the invention.

FIG. 4 depicts a flowchart of processing for updating the local file version 152, according to an embodiment of the invention. Control begins at block 400. Control then continues to block 405 where the utility 150 detects accessing of the remote file version 182. In an embodiment, the accessing of the remote file version 182 may be performed by a user, a browser, an application, an operating system, or any other appropriate technique. The accessing may include reading the remote file version 182 or downloading the remote file version 182 to a temporary location at the computer system 100 or to any appropriate location other than the local file version 152. Control then continues to block 410 where the utility 150 determines whether a file identifier of the remote file version 182 matches or is the same as the file identifier 240 of the local file version 152 via a record in the file attribute data 154.

If the determination at block 410 is true, then the remote file identifier matches the local file identifier in the file attribute data 154 and the utility 150 has found a local version of the remote version of the file in response to the detecting of the access, so control continues to block 415 where the utility 150 determines whether the remote file version 182 and/or the local file version 152 meet or satisfy the conditional criteria specified by the rule 330 associated with the local file version 152. For example, the utility 150 determines whether the remote version 182 of the file was created more recently than the local version 152, determines whether the remote version 182 has a level that is greater than the level 250 of the local version 152, determines whether the remote version 182 is stored at a source location 180 that matches or is specified in the rule 330, and/or determines whether the local version 152 has not been edited locally at the computer 100 (e.g. by a user via an editor at the computer 100) subsequent to the most-recent update from the remote version 182.

If the determination at block 415 is true, then the remote file version 182 and/or the local file version 152 do meet the rule 330 associated with the local file version 152, so control continues to block 420 where the utility 150 checks the remote file version 182 for validity. In various embodiments, the utility 150 checks the remote file version 182 for validity by calculating a hash function of the remote file version 182 and comparing the calculated hash value against a hash value for the file stored at a trusted site, by comparing the length or amount of data in the remote file version 182 against a value stored at a trusted site, by determining whether the remote file version 182 includes the total length of a song (as opposed to a portion of the song repeated multiple times) by comparing the wavelength of an audio file against a wavelength stored at a trusted site, or via any other appropriate technique. Control then continues to block 425 where the utility 150 determines whether the remote file version 182 is valid based on the validity check of block 420.

If the determination at block at block 425 is true, then the remote file version 182 is valid, so control continues to block 430 where the utility 150 updates the local file version 152 with the remote file version 182 and updates the retrieval source location identifier 245, the level 250, and/or the date 260 in the record associated with the local file version 152 in the file attribute data 154. For example, the utility 150 replaces the local file version 152 with the remote file version 182 or copies the remote file version 182 over the local file version 152 and stores an identifier of the source location 180 of the remote file version 182 in the retrieval source location identifier 245, stores the level of the remote file version 182 in the level 250 associated with the local file version 152 and stores the date of the remote file version 182 in the date 260 associated with the local file version 152. Control then continues to block 499 where the logic of FIG. 4 returns.

If the determination at block 425 is false, then the remote file version 182 is not valid, so control continues to block 426 where the utility 150 optionally notifies the user of the reason why the local version was not updated. For example, the utility 150 presents the rule 330 that was not met or the reason of the invalidity of the remote version 182 via a user interface, e.g., on the terminals 121, 122, 123, or 124. Control then continues to block 499 without updating the local file version 152.

If the determination at block 415 is false, then the remote file version 182 and/or the local file version 152 do not meet the rule 330, so control continues to block 426 where the utility 150 optionally notifies the user of the reason why the local version was not updated. For example, the utility 150 presents the rule 330 that was not met via a user interface, e.g., on the terminals 121, 122, 123, or 124. Control then continues to block 499 where the logic of FIG. 4 returns.

If the determination at block 410 is false, then the file identifier of the remote file version 182 does not match the file identifier of the local file version 152 in the file attribute data 154, so control continues from block 410 to block 435 where the utility 150 determines whether the creation of the local file version 152 is detected. The utility 150 may detect the creation of the local file version 152, e.g., if the user, browser, or other program has stored the remote file version 182 that was previously accessed at block 405 to the local file version 152.

If the determination of block 435 is true, then creation of the local file version 152 is detected, so control continues to block 440 where the utility 150 creates a record in the file attribute data 154 for the local file version 152, including the retrieval source location identifier 245, the level 250, and of the date 260, and optionally customizes a rule 330, associated with the created local file version 152. For example, the utility 150 may present via a user interface on one of more of the terminals 121, 122, 123, or 124 an opportunity for a user to enter a rule or conditional criteria, which the utility 150 stores in the rule 330 associated with the file identifier 325 of the created local file version 152. Control then continues to block 499 where the logic of FIG. 4 returns.

If the determination at block 435 is false, then the utility 150 did not detect creation of the local file version 152, so control continues from block 435 to block 499 where the logic of FIG. 4 returns.

Figure 5:
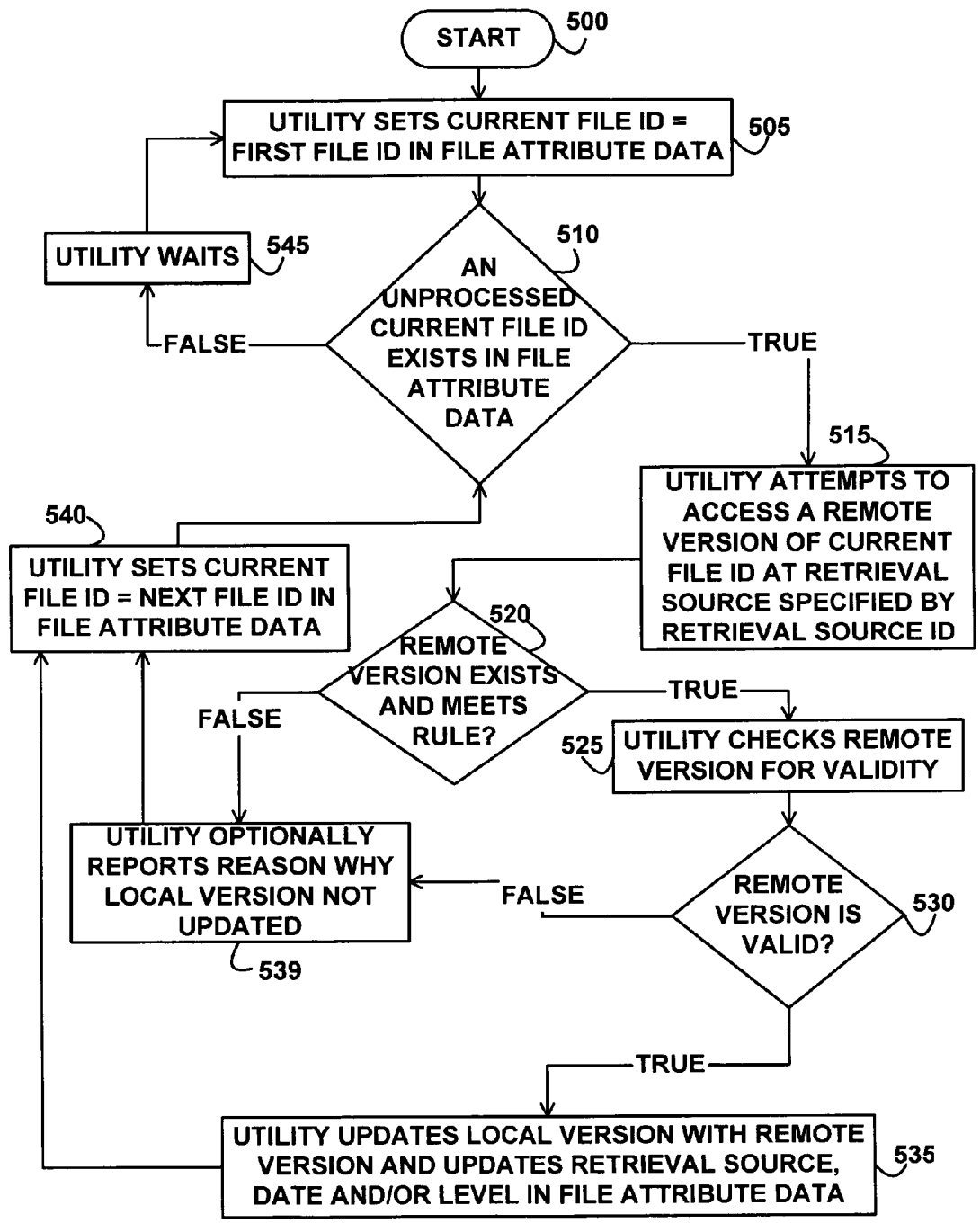
FIG. 5 depicts a flowchart of processing for searching for and updating the local file version, according to an embodiment of the invention.

FIG. 5 depicts a flowchart of processing for searching for and updating the local file version 152, according to an embodiment of the invention. Control begins at block 500. Control then continues to block 505 where the utility 150 sets a current file identifier to be the first file identifier in the file attribute data 154. Control then continues to block 510 where the utility 150 determines whether a current file identifier unprocessed by the loop logic (that starts at block 510) of FIG. 5 exists in the file attribute data 154. If the determination of block 510 is true, then an unprocessed current file identifier exists, so control continues to block 515 where the utility 150 attempts to access the remote version 182 of the current file identifier 240 at the retrieval source location 180 specified by the retrieval source location identifier 245. For example, the utility 150 reads the remote version 182, determines that the remote version 182 exists, downloads the remote version 182 to a temporary storage location different from the local file version 152, determines that the remote version 182 does not exist, or determines that the retrieval source location identifier 245 is stale or out-of date.

Control then continues to block 520 where the utility 150 determines whether the remote file version 182 exists, can be accessed, and meets the rule 330 associated with the local file version 152. For example, the utility 150 determines whether the remote version 182 of the file was created more recently than the local version 152, determines whether the remote version 182 has a level that is greater than the level 250 of the local version 152, determines whether the remote version 182 is stored at a source location 180 that matches or is specified in the rule 330, and/or determines whether the local version 152 has not been edited or modified locally at the computer 100 (e.g. by a user via an editor at the computer 100) subsequent to the most-recent update from the remote version 182.

If the determination at block 520 is true, then the remote file version 182 exists and can be accessed and the remote file version 182 and/or the local file version 152 do meet the rule 330 associated with the local file version 152, so control continues to block 525 where the utility 150 checks the remote file version 182 for validity. In various embodiments, the utility 150 checks the remote file version 182 for validity by calculating a hash function of the remote file version 182 and comparing the calculated hash value against a hash value for the file stored at a trusted site, by comparing the length or amount of data in the remote file version 182 against a value stored at a trusted site, by determining whether the remote file version 182 includes the total length of a song (as opposed to a portion of the song repeated multiple times) by comparing the wavelength of an audio file against a wavelength stored at a trusted site, or via any other appropriate technique. Control then continues to block 530 where the utility 150 determines whether the remote file version 182 is valid based on the validity check of block 525.

If the determination at block at block 530 is true, then the remote file version 182 is valid, so control continues to block 535 where the utility 150 updates the local file version 152 with the remote file version 182 and updates the retrieval source location identifier 245, the level 250, and/or the date 260 in the record associated with the local file version 152 in the file attribute data 154. For example, the utility 150 replaces the local file version 152 with the remote file version 182 or copies the remote file version 182 over the local file version 152 and stores an identifier of the source location 180 of the remote file version 182 in the retrieval source location identifier 245, stores the level of the remote file version 182 in the level 250 associated with the local file version 152 and stores the date of the remote file version 182 in the date 260 associated with the local file version 152. Control then continues to block 540 where the utility 150 sets the current file identifier 240 to be the next file identifier in the file attribute data 154. Control then returns to block 510, as previously described above.

If the determination at block 530 is false, then the remote file version 182 is not valid, so control continues from block 530 to block 539 where the utility 150 optionally notifies the user of the reason why the local version 152 was not updated. For example, the utility 150 presents the rule 330 that was not met or the reason for the invalidity of the remote version 182 via a user interface, e.g., on the terminals 121, 122, 123, or 124. Control then continues to block 540, as previously described above, without updating the local file version 152.

If the determination at block 520 is false, then the remote file version 182 and/or the local file version 152 do not meet the rule 330 or the remote file version 182 cannot be accessed or does not exist, so control continues to block 539 where the utility 150 optionally notifies the user of the reason why the local version was not updated. For example, the utility 150 presents the rule 330 that was not met or a notification that the remote version 182 could not be accessed via the retrieval source location identifier 245 or that the remote version 182 does not exist. Control then continues to block 540, as previously described above.

If the determination at block 510 is false, then an unprocessed current file identifier does not exist in the file attribute data 154, so control continues from block 510 to block 545 where the utility 150 waits for a period of time. Control then returns to block 505, as previously described above. In this way, the logic loop that starts at block 510, continues to block 515, and eventually ends again at block 510 is periodically performed by the utility 150, so that for each of multiple of the local file versions 152, the utility 150 periodically finds a respective remote version 182 of the file, determines whether the remote version meets a rule 330, and if the determining is true, updates the local version 152 with the remote version 182.

In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of records, entries, or organizations of data may be used. In addition, any data may be combined with logic, so that a separate data structure is not necessary. The previous detailed description is, therefore, not to be taken in a limiting sense, and the scope of the present invention is defined only by the appended claims.

In the previous description, numerous specific details were set forth to provide a thorough understanding of the invention. But, the invention may be practiced without these specific details. In other instances, well-known circuits, structures, and techniques have not been shown in detail in order not to obscure the invention.

What is claimed is:

1. A method comprising:
   for each of a plurality of local versions of files and a plurality of associated respective rules, periodically finding a respective remote version of the respective file and determining whether the respective remote version meets the respective rule that is associated with the respective file;
   if the respective remote version meets the respective rule that is associated with the respective file, updating the respective local version with the respective remote version;
   if the respective remote version does not meet the respective rule that is associated with the respective file, presenting a respective reason why the respective local version was not updated, wherein the respective reason comprises the respective rule of the plurality of rules that was not met, wherein the plurality of rules comprise conditional criteria for updating the plurality of local versions, wherein a first rule of the plurality of rules that is associated with a first file specifies to only update a first local version if a first remote version has a first level of function that is more advanced than a threshold level specified in the first rule, wherein a second rule of the plurality of rules that is associated with a second file specifies to only update a second local version if a second remote version has a second level that is greater than a local level of the second local version, wherein a third rule of the plurality of rules that is associated with a third file specifies to only update a third local version if a third remote version is stored at a remote source location that matches a source location specified in the third rule; and
   customizing the plurality of rules for the plurality of associated respective files, wherein the customizing the plurality of rules comprises storing the respective rule that was received via a user interface, wherein at least some of the plurality of respective rules associated with different respective files are different from each other.

2. The method of claim 1, further comprising:
   for each of the plurality of local versions of files, detecting a creation of the respective local version of the file; and
   performing the customizing the respective rule for the respective file in response to the detecting the creation.

3. The method of claim 1, wherein the determining further comprises:
   determining whether the respective remote version of the respective file was created more recently than the respective local version.

4. The method of claim 1, wherein the determining further comprises:
   determining whether the respective remote version is valid.

5. The method of claim 1, wherein the second level comprises an audio quality of the second file.

6. The method of claim 1, wherein the second level comprises a video quality of the second file.

7. The method of claim 1, wherein the second level comprises an update identifier of the second file.

8. The method of claim 1, wherein the determining further comprises:
   determining whether the respective local version has not been edited subsequent to a most-recent update of the respective local version with the respective remote version.

9. A storage medium encoded with instructions, wherein the instructions when executed comprise:
   for each of a plurality of local versions of files and a plurality of associated respective rules, periodically finding a respective remote version of the respective file and determining whether the respective remote version meets the respective rule that is associated with the respective file;
   if the respective remote version meets the respective rule that is associated with the respective file, updating the respective local version with the respective remote version;
   if the respective remote version does not meet the respective rule that is associated with the respective file, presenting a respective reason why the respective local version was not updated, wherein the respective reason comprises the respective rule of the plurality of rules that was not met, wherein the plurality of rules comprise conditional criteria for updating the plurality of local versions, wherein a first rule of the plurality of rules that is associated with a first file specifies to only update a first local version if a first remote version has a first level that has a first level of function that is more advanced than a threshold level specified in the first rule, wherein a second rule of the plurality of rules that is associated with a second file specifies to only update a second local version if a second remote version has a second level that is greater than a local level of the second local version, wherein a third rule of the plurality of rules that is associated with a third file specifies to only update a third local version if a third remote version is stored at a remote source location that matches a source location specified in the third rule; and
   customizing the plurality of rules for the plurality of associated respective files, wherein the customizing the plurality of rules comprises storing the respective rule that was received via a user interface, wherein at least some of the plurality of respective rules associated with different respective files are different from each other.

10. The storage medium of claim 9, wherein the determining further comprises:
   determining whether the respective remote version is valid.

11. The storage medium of claim 9, wherein the determining further comprises:
   determining whether the respective remote version of the respective file was created more recently than the respective local version.

12. The storage medium of claim 9, wherein the determining further comprises:
   determining whether the respective local version has not been edited subsequent to a most-recent update of the respective local version with the respective remote version.

13. The storage medium of claim 9, further comprising:
   for each of the plurality of local versions of files, detecting a creation of the respective local version of the file; and
   performing the customizing the respective rule for the respective file in response to the detecting the creation.

14. The storage medium of claim 9, wherein the second level comprises an audio quality of the second file.

15. A method for configuring a computer, comprising:
   configuring the computer to, for each of a plurality of local versions of files and a plurality of associated respective rules, periodically find a respective remote version of the respective file and determine whether the respective remote version meets the respective rule that is associated with the respective file;
   configuring the computer to, if the respective remote version meets the respective rule that is associated with the respective file, update the respective local version with the respective remote version;
   configuring the computer to, if the respective remote version does not meet the respective rule that is associated with the respective file, present a respective reason why the respective local version was not updated, wherein the respective reason comprises the respective rule of the plurality of rules that was not met, wherein the plurality of rules comprise conditional criteria for updating the plurality of local versions, wherein a first rule of the plurality of rules that is associated with a first file specifies to only update a first local version if a first remote version has a first level of function that is more advanced than a threshold level specified in the first rule, wherein a second rule of the plurality of rules that is associated with a second file specifies to only update a second local version if a second remote version has a second level that is greater than a local level of the second local version, wherein a third rule of the plurality of rules that is associated with a third file specifies to only update a third local version if a third remote version is stored at a remote source location that matches a source location specified in the third rule; and
   configuring the computer to customize the plurality of rules for the plurality of associated respective files, wherein the configuring the computer to customize the plurality of rules comprises configuring the computer to store the respective rule that was received via a user interface, wherein at least some of the plurality of respective rules associated with different respective files are different from each other.

16. The method of claim 15, wherein the configuring the computer to determine further comprises:
   configuring the computer to determine whether the respective remote version is valid.

17. The method of claim 15, wherein the configuring the computer to determine further comprises:
   configuring the computer to determine whether the respective remote version of the respective file was created more recently than the respective local version.

18. The method of claim 15, wherein the configuring the computer to determine further comprises:
   configuring the computer to determine whether the respective local version has not been edited at the computer subsequent to a most-recent update of the respective local version with the respective remote version.

19. The method of claim 15, further comprising:
   configuring the computer to, for each of the plurality of local versions of files, detect a creation of the respective local version of the file; and
   configuring the computer to perform the customizing the respective rule for the respective file in response to the configuring the computer to detect the creation.

* * * * *